(12) United States Patent
Ishihara et al.

(10) Patent No.: US 10,728,637 B2
(45) Date of Patent: Jul. 28, 2020

(54) ELECTRONIC APPARATUS HAVING A CHASSIS FOR A SPEAKER AND AN ANTENNA

(71) Applicant: Lenovo (Singapore) Pte. Ltd., Singapore (SG)

(72) Inventors: Jun Ishihara, Kanagawa (JP); Shigekazu Hawaka, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/396,158

(22) Filed: Apr. 26, 2019

(65) Prior Publication Data

US 2020/0186900 A1 Jun. 11, 2020

(30) Foreign Application Priority Data

Dec. 11, 2018 (JP) .................................. 2018-231851

(51) Int. Cl.
*H04R 1/02* (2006.01)
*G06F 1/16* (2006.01)
*H01Q 1/22* (2006.01)

(52) U.S. Cl.
CPC ............. *H04R 1/02* (2013.01); *G06F 1/1656* (2013.01); *G06F 1/1688* (2013.01); *G06F 1/1698* (2013.01); *H01Q 1/2266* (2013.01); *G06F 1/1616* (2013.01); *H04R 2499/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,963,640 A | * | 10/1999 | Rabe | H04M 1/0214 379/433.02 |
| 8,553,907 B2 | * | 10/2013 | Thomason | G06F 1/1656 381/103 |
| 2013/0170688 A1 | * | 7/2013 | Cohen | H04M 1/035 381/340 |

FOREIGN PATENT DOCUMENTS

| | | |
|---|---|---|
| JP | 2002-124811 A | 4/2002 |
| JP | 2005-536912 A | 12/2005 |
| JP | 2006-245866 A | 9/2006 |
| JP | 2007-060667 A | 3/2007 |
| JP | 2008-10981 A | 1/2008 |
| JP | 2013-081260 A | 5/2013 |
| JP | 2013-162413 A | 8/2013 |
| JP | 2014-013970 A | 1/2014 |
| JP | 2016-213671 A | 12/2016 |
| WO | 2004/004408 A1 | 1/2004 |

* cited by examiner

*Primary Examiner* — Duc Nguyen
*Assistant Examiner* — Assad Mohammed
(74) *Attorney, Agent, or Firm* — Osha Liang LLP

(57) ABSTRACT

An electronic apparatus includes a floating section which has a speaker part and a first box part provided with a first cavity portion functioning as a back chamber of the speaker part and is fixed to a main body chassis in a floatable state inside the main body chassis, a rigid section which has a second box part provided with a second cavity portion and which is rigidly fixed to the main body chassis inside the main body chassis and formed with an antenna on at least a part of the second box part, and a connecting pipe which connects the first box part and the second box part through a vibration buffer part and communicates the first cavity portion and the second cavity portion with each other.

6 Claims, 9 Drawing Sheets

ELECTRONIC APPARATUS HAVING A CHASSIS FOR A SPEAKER AND AN ANTENNA

TECHNICAL FIELD

The present invention relates to an electronic apparatus having antennas and speakers.

BACKGROUND

An electronic apparatus like a notebook type personal computer (laptop PC) has been equipped with antennas for various wireless communications such as a WWAN (Wireless Wide Area Network), a WLAN (Wireless Local Area Network), etc. (refer to, for example, Japanese Unexamined Patent Application Publication No. 2013-162413). Further, such an electronic apparatus has been equipped with speakers for the output of music, voice, etc. (refer to, for example, Japanese Unexamined Patent Application Publication No. 2014-13970).

SUMMARY

Meanwhile, since a chassis of the above electronic apparatus has been rapidly advanced in its miniaturization and thinning, it is difficult for the chassis to sufficiently ensure installation spaces of the antennas and speakers.

That is, the antenna is easy to be thinned, but required to be disposed facing a radio wave transmissive material. Also, the antenna is required to be rigidly fixed to the chassis to secure a stable ground and electromagnetic wave shield performance stable to other electronic parts. On the other hand, the speaker needs a large cavity portion functioning as a back chamber as for a low tone in particular. Further, since the speaker vibrates upon its driving, it is necessary to prevent vibrations from being transmitted to the chassis and other parts. The speaker is normally supported by the chassis in a floating state using a rubber bush or the like.

Thus, in such an electronic apparatus as described above, there has been a demand for a configuration capable of keeping communication quality and high tone quality while efficiently arranging the antennas and the speakers inside the chassis.

One or more embodiments of the present invention provide an electronic apparatus capable of efficiently arranging antennas and speakers therein.

An electronic apparatus according to one or more embodiments of the present invention is an electronic apparatus having a chassis. The electronic apparatus includes a floating section which has a speaker part and a first box part provided with a first cavity portion functioning as a back chamber of the speaker part and is fixed to the chassis in a floatable state inside the chassis, a rigid section which has a second box part provided with a second cavity portion and which is rigidly fixed to the chassis inside the chassis and formed with an antenna on at least a part of the second box part, and a connecting pipe which connects the first box part and the second box part through a vibration buffer part and communicates the first cavity portion and the second cavity portion with each other.

According to such a configuration, the second cavity portion of the rigid section and the connecting pipe function as a back chamber of the speaker part together with the first cavity portion of the floating section. Thus, even if the electronic apparatus is configured by a small-sized and thin chassis, the capacity of the back chamber of the speaker part can be enlarged inside the chassis, and hence sound quality is improved. At this time, in the electronic apparatus, since the second box part is provided in a space (dead space) which overlaps with the antenna capable of being configured thinner than a speaker, and is utilized as the back chamber of the speaker part, the use efficiency of the space in the chassis is improved. Further, the electronic apparatus has the vibration buffer part between the floating section fixed in the floating state, and the rigid section fixed rigidly. It is therefore possible to suppress the vibration of the speaker part from being transmitted to the rigid section provided with the antenna, and the main body chassis, etc.

The connecting pipe may be configured to be formed of a material having rubber elasticity and include a function of the vibration buffer part. Doing so enables the configuration of the connecting pipe and its peripheral parts to be simplified as compared with the configuration of additionally providing the vibration buffer part in addition to the connecting pipe.

There may be adopted a configuration in which an outer wall of the chassis has a radio wave transmission part formed of a radio wave transmissive material, and a conductive part formed of a conductive material, and the antenna is disposed facing the radio wave transmission part and electrically connected to the conductive part. Consequently, communication quality of the antenna is improved. Further, the conductive part provided at a part of the chassis functions as a part of the antenna, and hence the communication quality of the antenna is further improved.

There may be adopted a configuration in which the rigid section is disposed along the outer wall of the chassis, and the rigid section has, at a surface of the second box part where the antenna is not formed, a shield wall formed of an electromagnetic wave shielding material. Doing so enables electromagnetic waves from other electronic parts each being an electromagnetic wave generation source mounted in the chassis of the electronic apparatus to be suppressed from being adversely influenced on the antenna.

There may be adopted a configuration in which a shield member formed of an electromagnetic wave shielding material is provided at a part of the surface of the second box part, and the shield member is in contact with an inner surface of the chassis. Doing so enables electromagnetic waves from other electronic parts each being an electromagnetic wave generation source mounted in the chassis of the electronic apparatus to be suppressed from being adversely influenced on the antenna.

There may be adopted a configuration in which a high-tone speaker provided inside the chassis is further arranged, and the speaker part, the floating section, the rigid section, and the connecting pipe function as a low-tone speaker. Consequently, the chamber capacity of the low-tone speaker required to have the largest chamber capacity, of various speakers can be efficiently enlarged by using the box part of the rigid section provided with the antenna.

One or more embodiments of the present invention can efficiently arrange antennas and speakers inside the chassis of the electronic apparatus.

DETAILED DESCRIPTION

An electronic apparatus according to one or more embodiments of the present invention will hereinafter be described in detail with reference to the accompanying drawings.

Figure 1:
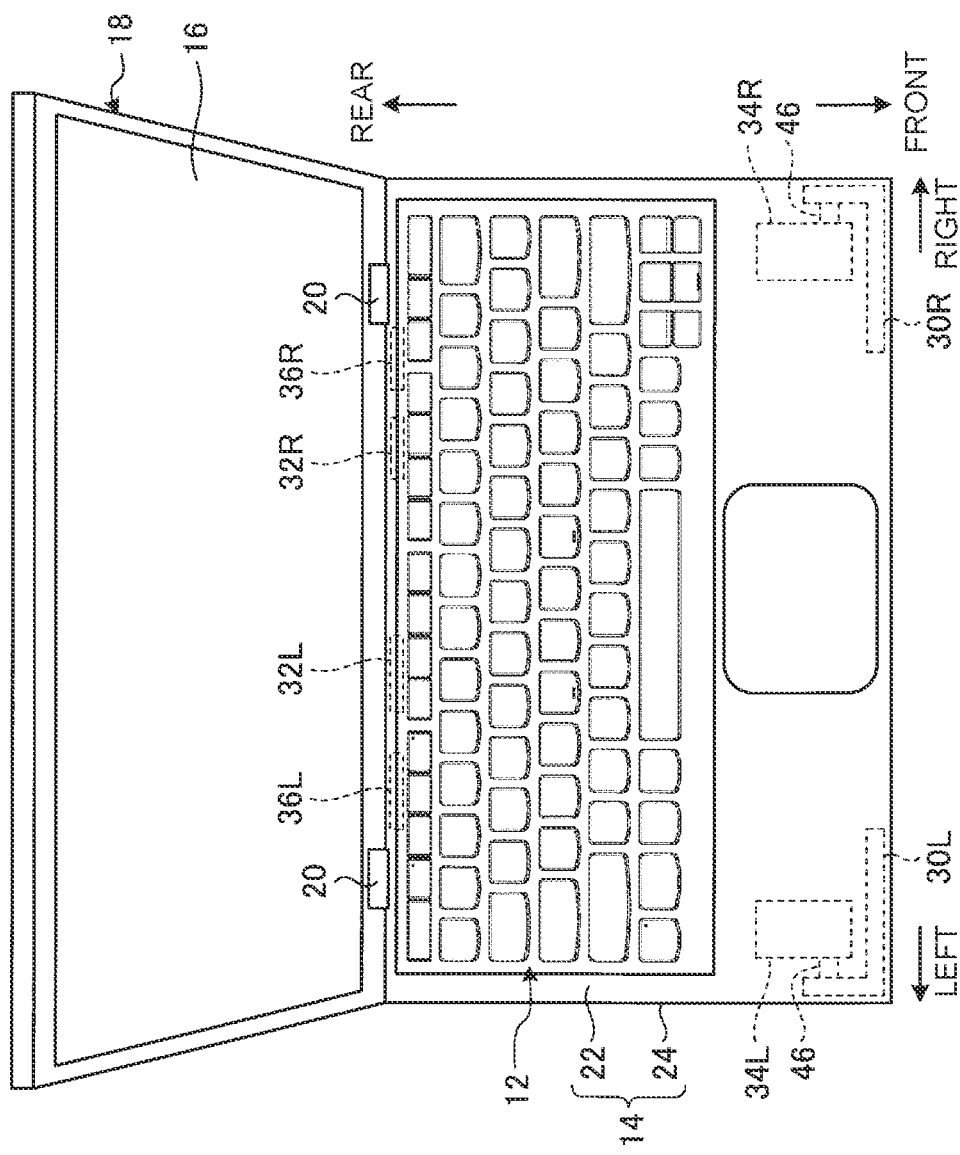
FIG. 1 is a plan view of an electronic apparatus according to one or more embodiments.

FIG. 1 is a plan view of an electronic apparatus 10 according to one or more embodiments. In one or more embodiments, a laptop PC is exemplified as the electronic apparatus 10. The electronic apparatus 10 may be a desktop PC, a tablet PC, or the like.

As illustrated in FIG. 1, the electronic apparatus 10 includes a main body chassis 14 having a keyboard device 12, and a display chassis 18 having a display device 16. The display chassis 18 is rotatably connected to a rear end of the main body chassis 14 through a pair of right and left hinges 20 and 20. The display device 16 is, for example, a liquid crystal display.

FIG. 1 is a diagram viewing down from above, the electronic apparatus 10 in a use form with the display chassis 18 being opened from the main body chassis 14 by the hinges 20. On the basis of the direction in which the display device 16 of the electronic apparatus 10 having the use form illustrated in FIG. 1 is viewed from the front, the front of the main body chassis 14, its back, its thickness direction, and its width direction will hereinafter be referred to as the front, the rear, the top and bottom, and the right and left respectively for the purpose of description. Further, as to the main body chassis 14 and each component to be mounted thereto, the central side than the outer peripheral side, and the outer peripheral side than the central side in a state in which the main body chassis 14 is seen in a planar manner will respectively be referred to as the inside and outside for the purpose of description. Incidentally, the directions of these are shown for convenience of description. Accordingly, for example, the above-mentioned top and bottom directions and right and left directions may be inversed depending on the arrangement of each component in a product, its installation attitude, etc.

The main body chassis 14 is a thin box-like chassis formed of a top cover 22 and a bottom cover 24. The top cover 22 is a plate-like member which forms a top surface and four peripheral side surfaces of the main body chassis 14. The bottom cover 24 is a plate-like member which forms a bottom surface of the main body chassis 14.

Figure 2:
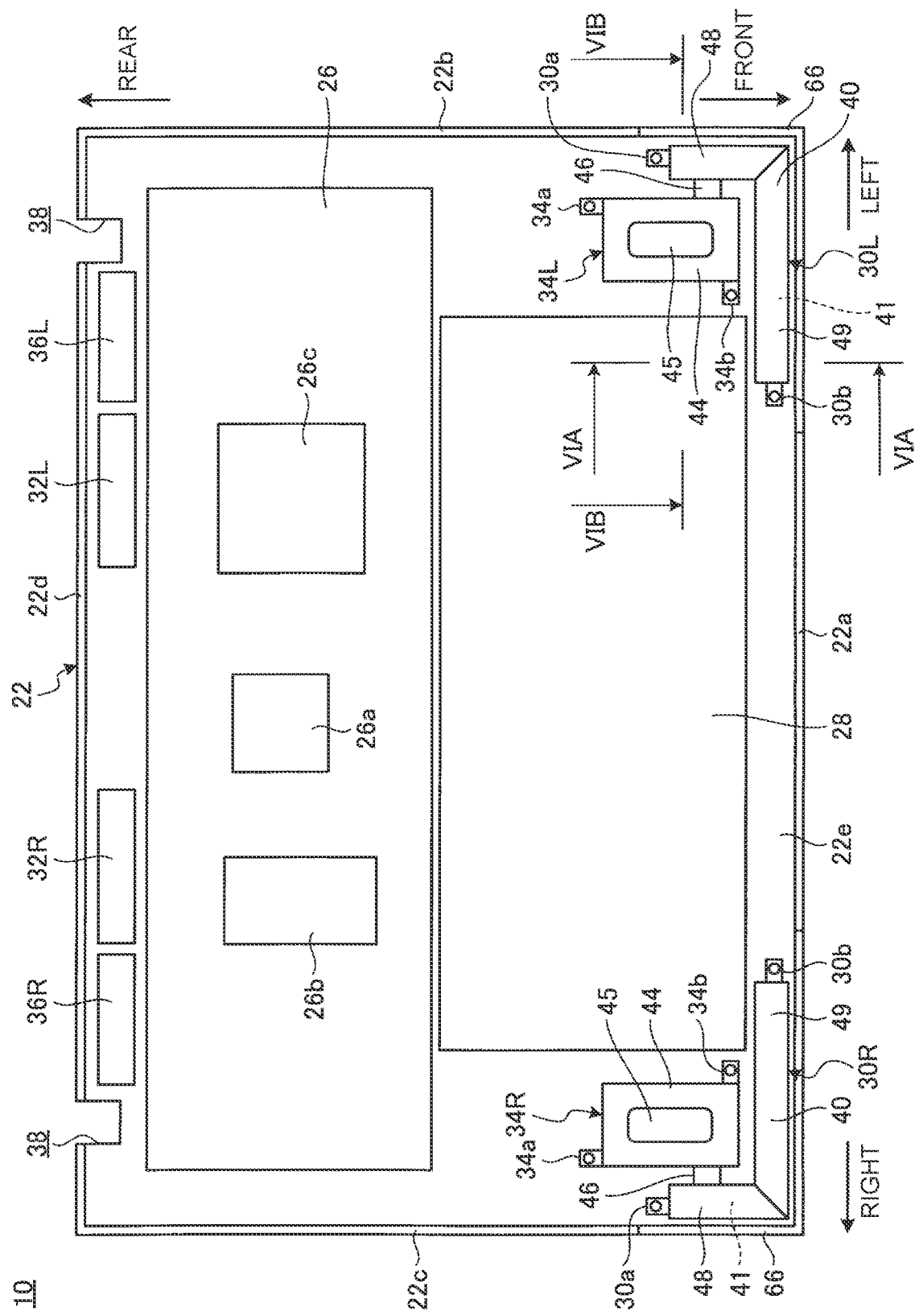
FIG. 2 is a bottom view typically illustrating an internal structure of a main body chassis.

FIG. 2 is a bottom view typically illustrating an internal structure of the main body chassis 14 and a view when viewing from the inner surface side of the top cover 22, the interior of the main body chassis 14 with the bottom cover 24 detached therefrom.

As illustrated in FIG. 2, there are accommodated inside the main body chassis 14, an electronic circuit board 26, a battery device 28, a pair of right and left rigid sections 30L and 30R, a pair of right and left antennas 32L and 32R, a pair of right and left floating sections 34L and 34R, and a pair of right and left high-tone speakers 36L and 36R. A cooling module, a hard disk device, etc. not shown in the drawing are further accommodated inside the main body chassis 14. Reference numerals 38 in FIG. 2 are recessed portions where the hinges 20 are to be arranged.

The electronic circuit board 26 is a motherboard of the electronic apparatus 10. The electronic circuit board 26 is, for example, a PCB (Printed Circuit Board) on which various electronic parts such as a CPU 26a, a power supply circuit 26b, a memory 26c, etc. are mounted.

The rigid sections 30L and 30R (hereinafter collectively also called a "rigid section 30") serve as mounting bases for antennas 41 based on the wireless communication standards of WWAN, for example. The rigid section 30 has a second box part 40 having a substantially L-shape in plan view. The antenna 41 is mounted to the surface of the second box part 40 together with an unillustrated antenna substrate and the like. The left rigid section 30L is disposed along a corner between a front wall 22a of the top cover 22 and a left outer wall 22b thereof. The right rigid section 30R is disposed along a corner between the front wall 22a of the top cover 22 and a right outer wall 22c thereof. The rigid section 30 is fixed rigidly to the top cover 22.

The antennas 32L and 32R are antennas based on the wireless communication standards of WLAN, for example. The antennas 32L and 32R are disposed along a rear wall 22d of the top cover 22 at positions between the right and left recessed portions 38 and 38. The antennas 32L and 32R are fixed rigidly to the top cover 22.

The floating sections 34L and 34R (hereinafter collectively also called a "floating section 34") respectively form a back chamber (speaker box) of a low-tone speaker (woofer) appropriate for the output of a low tone together with the rigid section 30 and a connecting pipe 46 to be described later. The floating section 34 has a first box part 44 having a rectangular shape in plan view, and a speaker part 45. The left floating section 34L is disposed at a position inside the L-shape of the left rigid section 30L. The right floating section 34R is disposed at a position inside the L-shape of the right rigid section 30R. The floating section 34 is fixed to the top cover 22 in a floatable state.

The high-tone speakers 36L and 36R are tweeters appropriate for the output of a high tone. The left high-tone speaker 36L is disposed side by side on the left of the left antenna 32L. The right high-tone speaker 36R is disposed side by side on the right of the right antenna 32R. The high-tone speakers 36L and 36R are fixed to the top cover 22 in a floatable state. Thus, a speaker system of the electronic apparatus 10 has a configuration of two-way four speakers having right and left low-tone speakers configured of the above speaker parts 45 and the floating sections 34L and 34R, etc., and the high-tone speakers 36L and 36R.

Figure 3A:
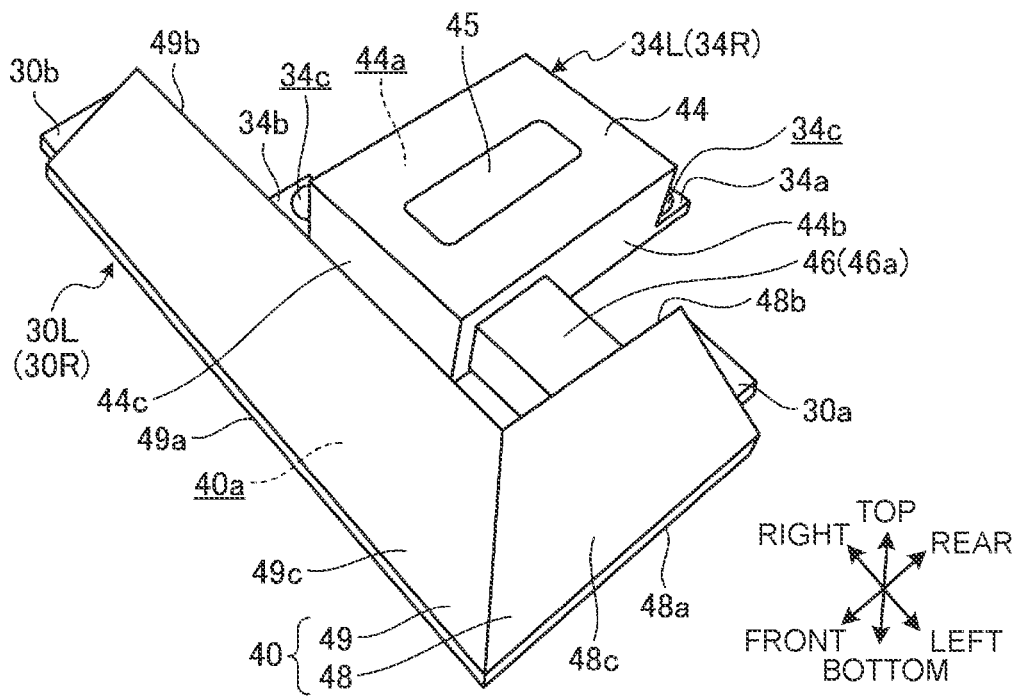
FIG. 3A is a typical perspective view of a rigid section and a floating section in a state of being viewed from a bottom surface of the main body chassis.
Figure 3B:
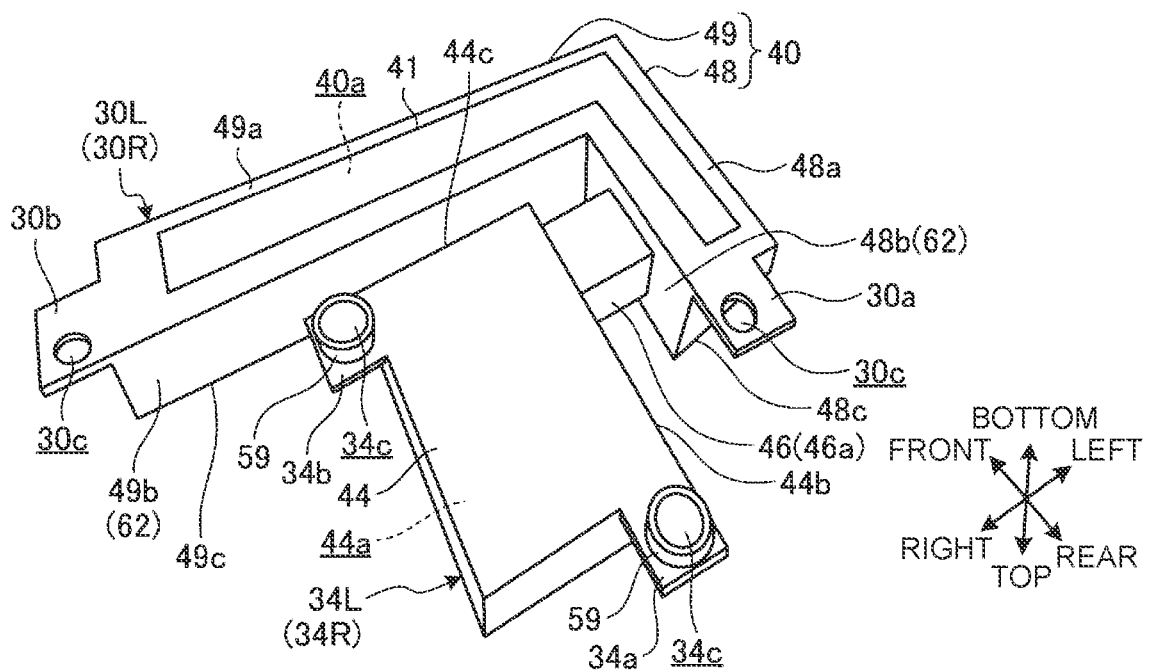
FIG. 3B is a typical perspective view of the rigid section and the floating section in a state of being viewed from a top surface of the main body chassis.
Figure 4:
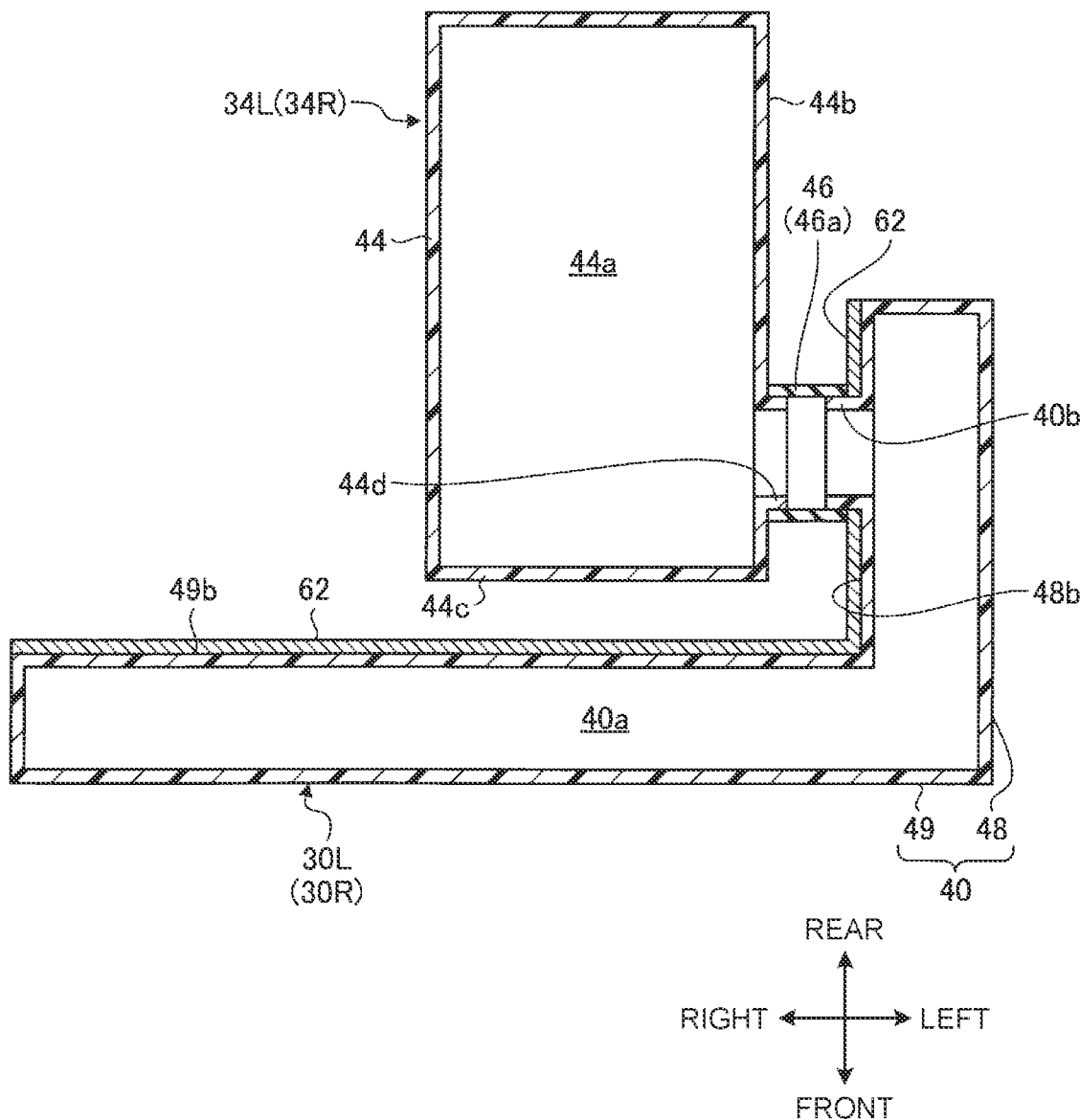
FIG. 4 is a typical plan sectional view of the rigid section and the floating section.

Next, description will be made as to a concrete configuration of the rigid section 30 and the floating section 34. FIG. 3A is a typical perspective view of the rigid section 30L and the floating section 34L in a state of being viewed from the bottom surface of the main body chassis 14. FIG. 3B is a typical perspective view of the rigid section 30L and the floating section 34L in a state of being viewed from the top surface of the main body chassis 14. FIG. 4 is a typical plan sectional view of the rigid section 30L and the floating section 34L. Incidentally, although the left rigid section 30L and the left floating section 34L are typically illustrated in FIGS. 3A through 4, and FIG. 5A and the like to be described later, the right rigid section 30R and the right floating section 34R are the same in configuration as those on the left except for being a right-left symmetrical structure.

As illustrated in FIGS. 3A, 3B and 4, the rigid section 30 and the floating section 34 are connected by the connecting pipe 46. The rigid section 30 has a second box part 40, an antenna 41, and mounting pieces 30a and 30b.

The second box part 40 is made of, for example, a resin and is a box body in which a cylindrical body triangular in section is formed into a substantially L-shape in plan view. The second box part 40 has a first cylindrical portion 48 disposed along front-rear direction and a second cylindrical portion 49 disposed along right-left direction. There is formed inside the second box part 40, a cavity portion 40a which extends from the first cylindrical portion 48 to the second cylindrical portion 49 substantially over the whole length thereof. The cavity portion 40a is a closed space in which only the connecting pipe 46 is made open and functions as the back chamber of the speaker part 45 together with the connecting pipe 46.

The first cylindrical portion 48 has a mounting surface 48a, an inner wall surface 48b, and an inclined surface 48c. The mounting surface 48a is a horizontal surface in front-rear and right-left directions, which is disposed opposite to an inner surface (bottom surface) 22e of the top cover 22 (refer to FIGS. 6A and 6B). The inner wall surface 48b is a vertical surface in front-rear and top-bottom directions, which is disposed opposite to an outer wall surface 44b of the floating section 34. The inclined surface 48c is a surface inclined to connect an outer end of the mounting surface 48a and a lower end of the inner wall surface 48b and is gradually inclined up from the inside to the outside within the main body chassis 14. The second cylindrical portion 49 has a mounting surface 49a, an inner wall surface 49b, and an inclined surface 49c. The mounting surface 49a is a horizontal surface in the front-rear and right-left directions, which is disposed opposite to the inner surface 22e of the top cover 22 (refer to FIGS. 6A and 6B). The inner wall surface 49b is a vertical surface in the front-rear and top-bottom directions, which is disposed opposite to a front wall surface 44c of the floating section 34. The inclined surface 49c is a surface inclined to connect an outer end of the mounting surface 49a and a lower end of the inner wall surface 49b and is gradually inclined up from the inside to the outside within the main body chassis 14.

The antenna 41 is a device to transmit and receive radio waves and is provided over the mounting surfaces 48a and 49a of the cylindrical portions 48 and 49. The antenna 41 has an antenna pattern (antenna element) formed on the mounting surfaces 48a and 49a by, for example, plating or printing. The antenna 41 is connected to the electronic circuit board 26 through an antenna substrate and a wire not illustrated in the drawing.

Figure 7:
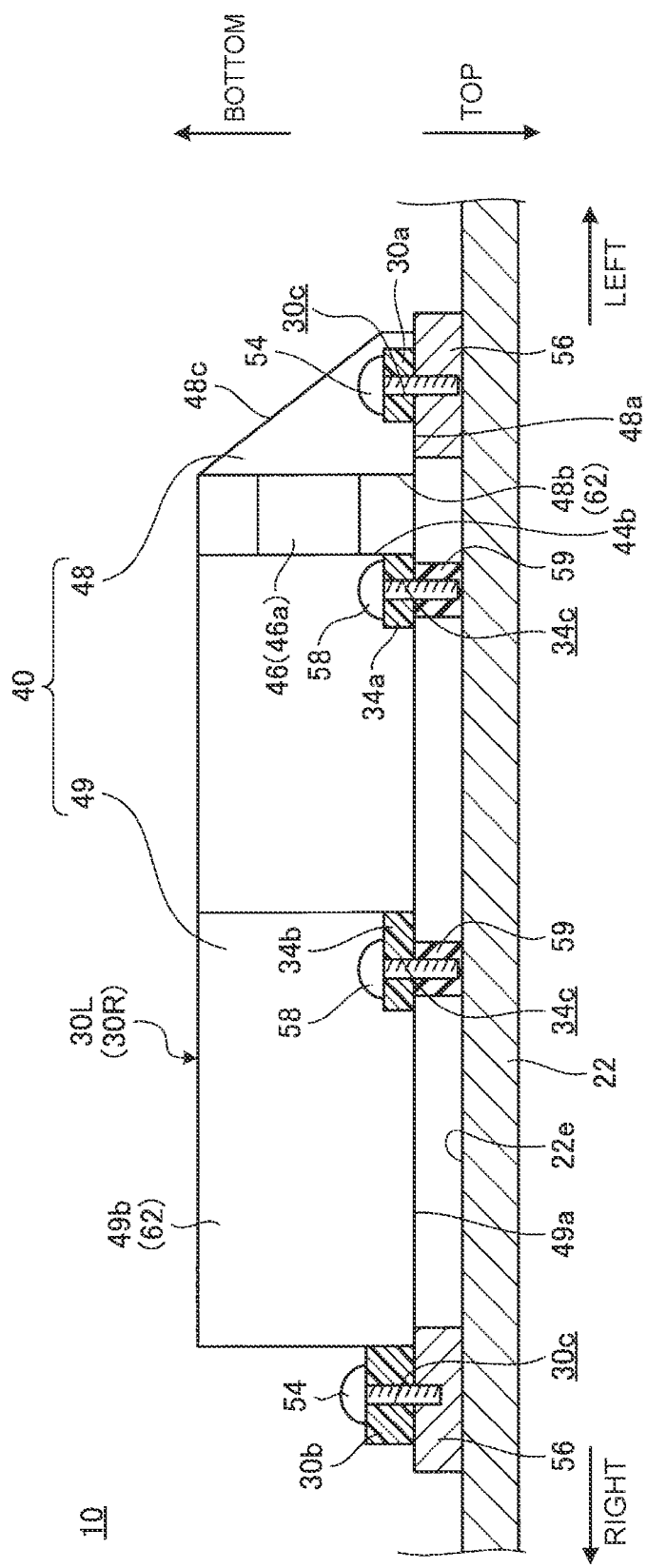
FIG. 7 is a sectional view typically illustrating a state in which the rigid section and the floating section are mounted to an inner surface of a top cover.

The mounting pieces 30a and 30b are parts to fix the rigid section 30 to the inner surface 22e of the top cover 22. Mounting holes 30c through which screws 54 (refer to FIG. 7) are inserted are formed in the mounting pieces 30a and 30b. As illustrated in FIG. 7, the rigid section 30 is fixed in a rigid state to, for example, rigid bosses 56 formed on the inner surface 22e of the top cover 22. The screws 54 also function as a ground of the rigid section 30.

As illustrated in FIGS. 3A, 3B and 4, the floating section 34 has the first box part 44, the speaker part 45, and mounting pieces 34a and 34b. The floating section 34 is disposed in a dead space inside the L-shape of the rigid section 30.

The speaker part 45 is a sound generation portion configured of a magnet, a coil, and a cone, etc. The first box part 44 is, for example, a rectangular parallelepiped box body made of a resin. A cavity portion 44a is formed inside the first box part 44. The cavity portion 44a is an enclosed space in which only the connecting pipe 46 is made open, and functions as the back chamber of the speaker part 45.

The mounting pieces 34a and 34b are parts to fix the floating section 34 to the inner surface 22e of the top cover 22. Mounting holes 34c through which screws 58 (refer to FIG. 7) are inserted are formed in the mounting pieces 34a and 34b. As illustrated in FIG. 7, the floating section 34 is fixed to the inner surface 22e in a floating state in which soft rubber bushes 59 are provided between the floating section 34 and the inner surface 22e of the top cover 22, for example.

As illustrated in FIGS. 3A, 3B, and 4, the connecting pipe 46 is a pipe line to connect the inner wall surface 48b of the second box part 40 and the outer wall surface 44b of the first box part 44 and communicate both cavity portions 40a and 44a with each other. The connecting pipe 46 is, for example, a tube formed of a material having flexibility, like rubber, a thermoplastic elastomer, a resin, or a gel material. The connecting pipe 46 more preferably has rubber elasticity in terms of the flexibility. A material having rubber elasticity includes, for example, silicone rubber, chloroprene rubber, ethylene-propylene rubber, etc. Thus, the connecting pipe 46 also functions as a vibration buffer part 46a which suppress transmission of vibration between the second box part 40 and the first box part 44, while communicating between the cavity portions 40a and 44a.

The connecting pipe 46 in one or more embodiments is a rubber tube. The connecting pipe 46 is externally inserted into an angular cylindrical port 40b protruded from the inner wall surface 48b and an angular cylindrical port 44d protruded from the outer wall surface 44b respectively (refer to FIG. 4). The connecting pipe 46 may have adhesion and fixing or the like directly to the inner wall surface 48b and the outer wall surface 44b.

Thus, the cavity portion 44a of the floating section 34 forms a large enclosed space communicated with the cavity portion 40a of the second box part 40 through the connecting pipe 46. The cavity portion 44a of the floating part 34, the cavity portion 40a of the rigid section 30, and the connecting pipe 46 therefore function as the back chamber of the speaker part 45. In addition, the connecting pipe 46 functions as the vibration buffer part 46a. Consequently, the vibration of the floating section 34 supported by the top cover 22 in a floatable state is prevented from being transmitted to the rigid section 30 rigidly fixed to the top cover 22.

Figure 5A:
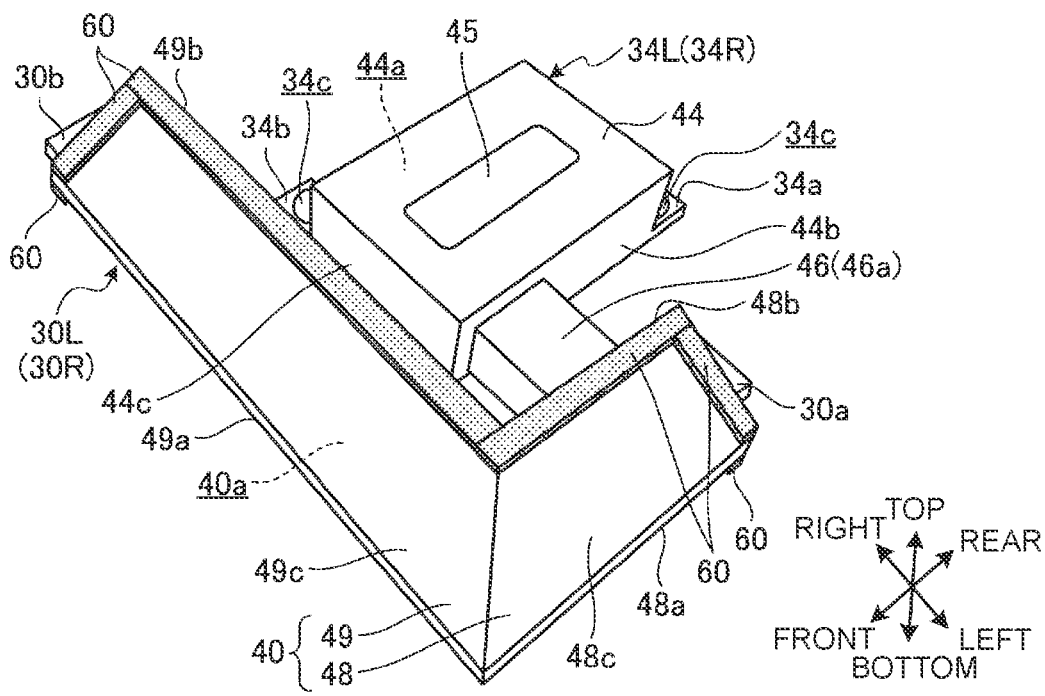
FIG. 5A is a typical perspective view in a state in which shield members are mounted to the rigid section illustrated in FIG. 3A.
Figure 5B:
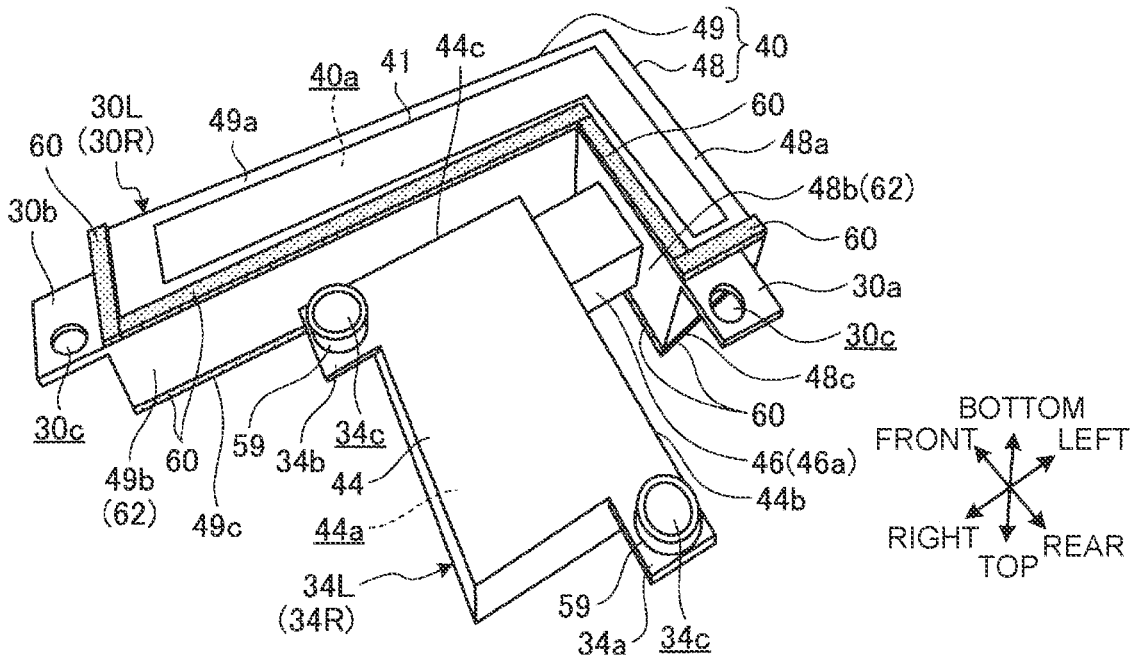
FIG. 5B is a typical perspective view in a state in which shield members are mounted to the rigid section illustrated in FIG. 3B.
Figure 6A:
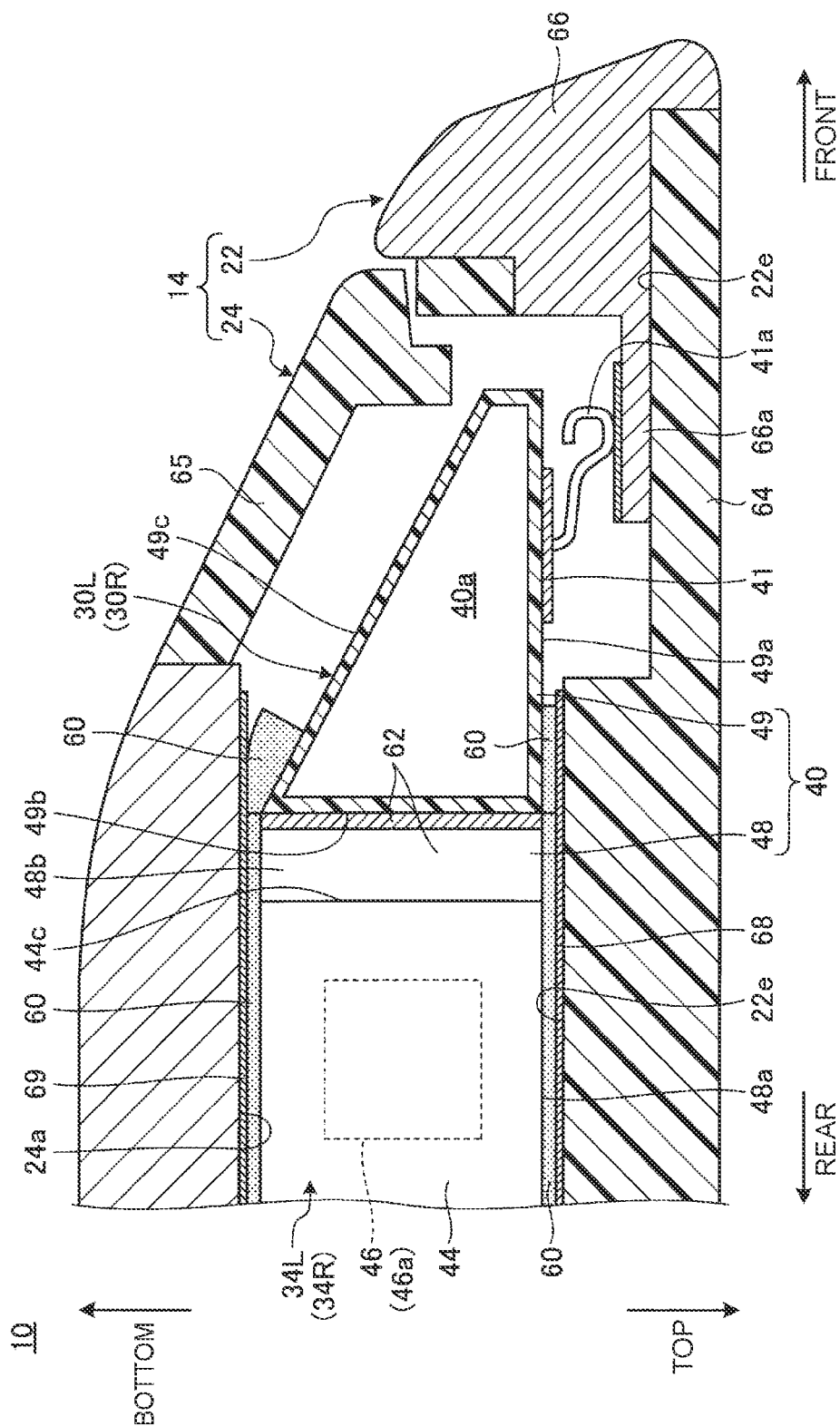
FIG. 6A is a typical sectional view of the main body chassis taken along line VIA-VIA in FIG. 2.
Figure 6B:
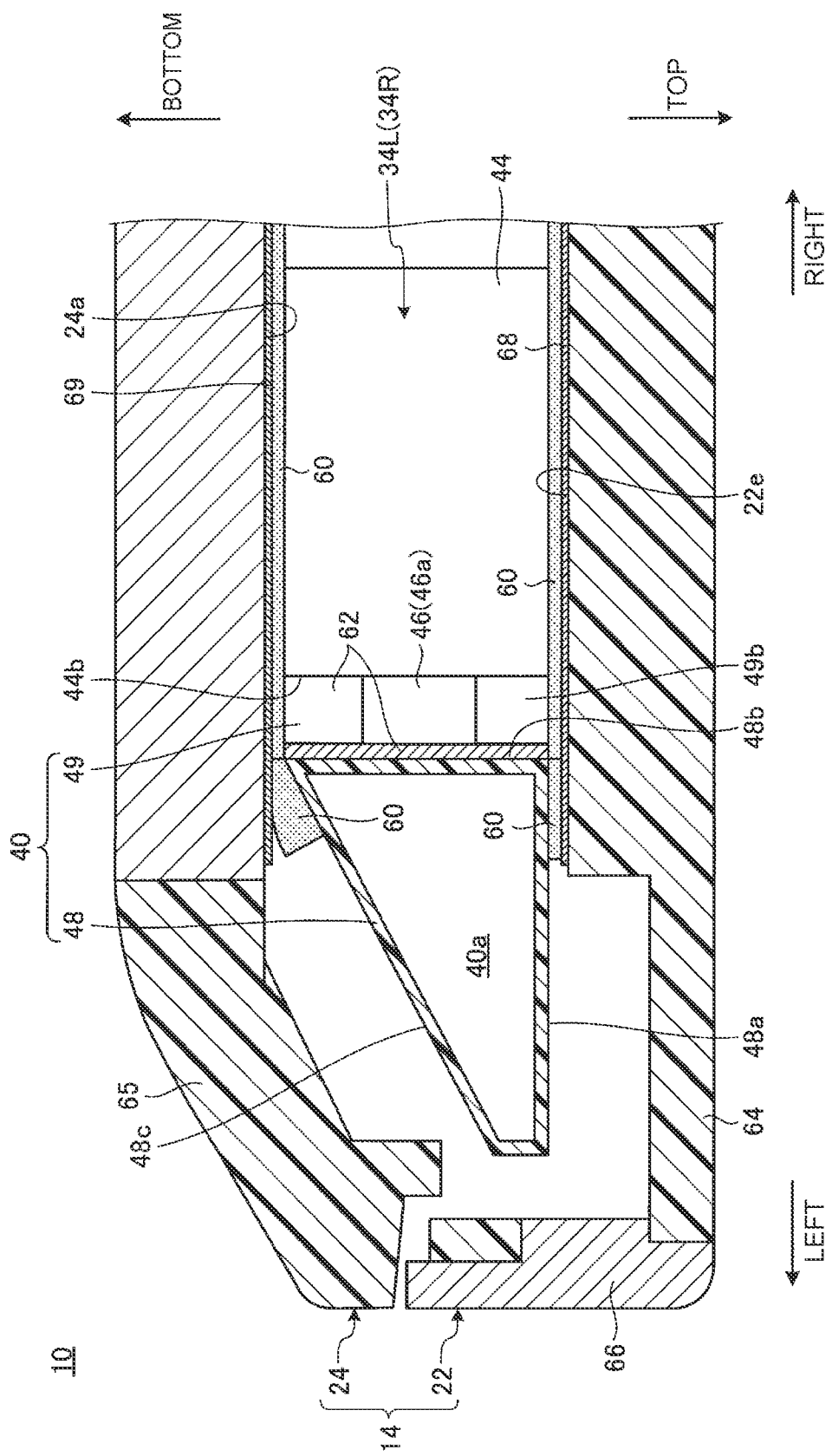
FIG. 6B is a typical sectional view of the main body chassis taken along line VIB-VIB in FIG. 2.

Next, description will be made as to a concrete mounting structure of the rigid section 30 and the floating section 34. FIG. 5A is a typical perspective view in a state in which shield members 60 are mounted to the rigid section 30L illustrated in FIG. 3A. FIG. 5B is a typical perspective view in a state in which shield members 60 are mounted to the rigid section 30L illustrated in FIG. 3B. FIG. 6A is a typical sectional view of the main body chassis 14 taken along line VIA-VIA in FIG. 2. FIG. 6B is a typical sectional view of the main body chassis 14 taken along line VIB-VIB in FIG. 2. FIG. 7 is a sectional view typically illustrating a state in which the rigid section 30L and the floating section 34L are mounted to the inner surface 22e of the top cover 22.

As illustrated in FIGS. 5A through 6B, the rigid section 30 has the shield members 60 and shield walls 62.

Each of the shield members 60 is formed of an electromagnetic wave shielding material having flexibility, e.g., a conductive spongy member. The conductive spongy member includes, for example, a sponge formed of a material in which tin-plating is applied to copper, a sponge in which a resin such as polyethylene or the like is kneaded with carbon, etc.

The shield member 60 is formed into a strip narrow in width and applied to each place of the surface of the second box part 40. Specifically, as illustrated in FIG. 5A, the shield member 60 is applied to edge portions of the inclined surfaces 48c and 49c extending along the inner wall surfaces 48b and 49b, and tip edge portions of the inclined surfaces 48c and 49c. Further, as illustrated in FIG. 5B, the shield member 60 is applied to edge portions of the mounting surfaces 48a and 49a extending along the inner wall surfaces 48b and 49b, and tip edge portions of the mounting surfaces 48a and 49a.

The shield wall 62 is formed of an electromagnetic wave shielding material, e.g., a metal plate having conductivity. The shield wall 62 is provided on the surface of the second box part 40, which is not formed with the antenna. In the case of one or more embodiments, the shield wall 62 is applied to substantially the entire surfaces of the inner wall surfaces 48b and 49b except for a connecting part of the connecting pipe 46 (refer to FIG. 4). Each of the inner wall surfaces 48b and 49b may be configured of a conductor to form the shield wall 62.

As illustrated in FIGS. 6A and 6B, the main body chassis 14 has radio wave transmission parts 64 and 65, a conductive part 66, and shield contact plates 68 and 69 at parts where the rigid section 30 and the floating section 34 are disposed.

In the case of one or more embodiments, the most parts of the top cover 22 and the bottom cover 24 are formed of a metal plate of magnesium or the like. The radio wave transmission parts 64 and 65 are provided at front end corners of these covers 22 and 24 and their peripheries and provided at positions to overlap with at least the rigid section 30 in plan view. The radio wave transmission parts 64 and 65 are parts which are formed of a radio wave transmissive material such as a resin and transmit radio waves transmitted and received by the antenna 41.

The radio wave transmission part 64 is provided at a position opposite to each of the mounting surfaces 48a and 49a of the top cover 22. Thus, the antenna 41 provided at the mounting surfaces 48a and 49a is capable of performing transmission and reception of radio waves from above the main body chassis 14 through the radio wave transmission part 64. The radio wave transmission part 65 is provided at a position opposite to each of the inclined surfaces 48c and 49c of the bottom cover 24. Consequently, the antenna 41 provided at the mounting surfaces 48a and 49a is capable of performing transmission and reception of radio waves even from below the main body chassis 14 through the second box part 40 and the radio wave transmission part 65.

The conductive part 66 is provided over the outer wall 22b (22c) from the front wall 22a of the top cover 22. That is, the conductive part 66 is provided at the side surface of the front end corner of the main body chassis 14. The conductive part 66 is formed of a metal having high conductivity such as copper, aluminum, etc. The conductive part 66 is formed with a fin-shaped terminal plate 66a extending along the inner surface 22e of the top cover 22. A spring terminal 41a electrically connected to the antenna 41 is protrusively provided at the mounting surface 49a of the rigid section 30. The spring terminal 41a is a hook-like plate spring whose tip is curved. When the rigid section 30 is arranged within the main body chassis 14, the spring terminal 41a comes into contact with the terminal plate 66a in a state of being elastically energized against the terminal plate 66a.

Each of the shield contact plates 68 and 69 is a thin plate formed of a metal having high conductivity such as copper, aluminum or the like. The shield contact plate 68 is provided on the inner surface 22e of the top cover 22 so as to come into contact with the shield members 60 provided on the mounting surfaces 48a and 49a of the rigid section 30. The shield contact plate 69 is provided on the inner surface 24a of the bottom cover 24 so as to come into contact with the shield members 60 provided on the inclined surfaces 48c and 49c of the rigid section 30. That is, the shield members 60 are in contact with the inner surfaces 22e and 24a of the main body chassis 14 through the shield contact plates 68 and 69. At this time, since the shield members 60 are configured to have flexibility, they are securely adhered to the shield contact plates 68 and 69. Incidentally, although not illustrated in FIGS. 6A and 6B, the shield contact plate 69 is provided such that parts thereof to be brought into contact with the shield members 60 provided to be inclined along a rear end edge of the inclined surface 48c and a side end edge of the inclined surface 49c can be securely adhered to the shield members 60 by being attached to an unillustrated inclined surface provided at the inner surface 24a, for example.

Accordingly, the rigid section 30 is installed inside the main body chassis 14 in a state in which the antenna 41 is electromagnetic-wave shielded by the shield members 60 and the shield walls 62 against an electromagnetic wave generation source such as the CPU 26a or the like. Further, the antenna 41 is electrically connected to the conductive part 66 through the spring terminal 41a, so that a part of the main body chassis 14, i.e., the conductive part 66 can also be made to function as the antenna element, thereby enhancing communication quality.

As described above, in the electronic apparatus 10, the floating section 34 is fixed to the main body chassis 14 in the floatable state so as not to transmit its vibration to the main body chassis 14 and other parts. Further, the rigid section 30 is rigidly fixed to the main body chassis 14 for the purpose of maintaining the stable ground by the screws 54, maintaining the state of connection to the electronic circuit board 26, maintaining the state of contact of the shield members 60 with the shield contact plates 68 and 69, and maintaining the state of connection to the conductive part 66, etc. Then, the cavity portion 40a of the second box part 40 in the rigid section 30, and the cavity portion 44a of the first box part 44 in the floating section 34 are communicated with each other by the connecting pipe 46 through the vibration buffer part 46a.

Thus, in the electronic apparatus 10, the cavity portion 44a of the first box part 44, the cavity portion 40a of the second box part 40, and the connecting pipe 46 function as the back chamber of the speaker part 45. Consequently, the electronic apparatus 10 is capable of enlarging the capacity of the back chamber of the speaker part 45 inside the small-sized and thin main body chassis 14 and thereby improves sound quality. At this time, in the electronic apparatus 10, the second box part 40 is provided in the space (dead space) which overlaps with the antenna 41 capable of being configured thinner than the floating section 34 equipped with the speaker part 45, and is utilized as the back chamber of the speaker part 45. Consequently, the back chamber of the speaker part 45 is expanded by effectively using the dead space, and hence the use efficiency of the space is high. Further, in the electronic apparatus 10, the floating section 34 fixed in the floating state, and the rigid section 30 fixed in the rigid state are connected by the connecting pipe 46 through the vibration buffer part 46a. It is therefore possible to suppress the vibration of the floating section 34 equipped with the speaker part 45 from being transmitted to the rigid section 30, the main body chassis 14, etc.

Figure 8:
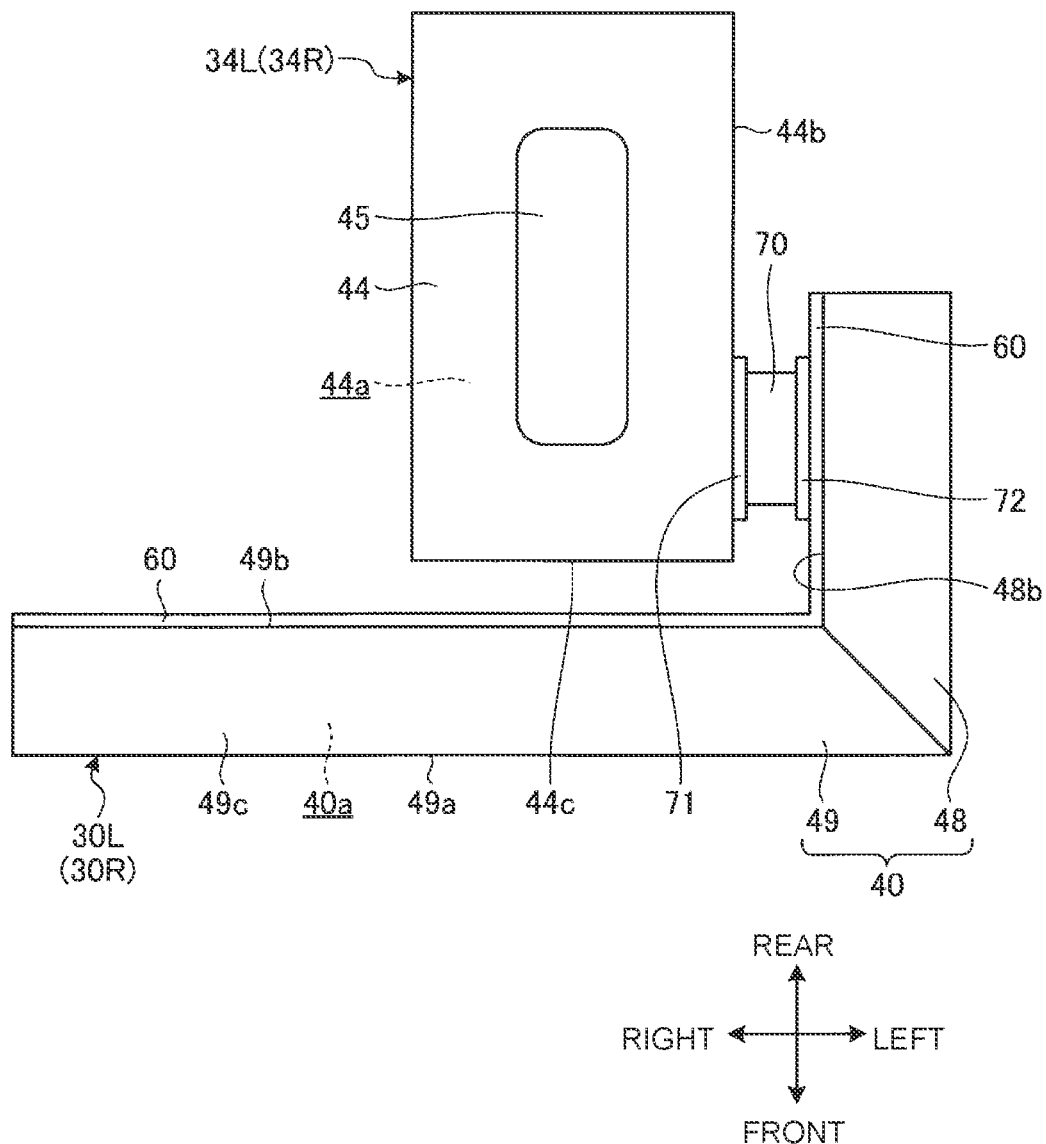
FIG. 8 is a plan view illustrating a configuration in which the floating section and the rigid section are connected by a connecting pipe according to a modification.

Although one or more embodiments has exemplified the configuration in which the connecting pipe 46 itself is provided with a function as the vibration buffer part 46a by forming the connecting pipe 46 with the material having rubber elasticity, a configuration using a rigid connecting pipe 70 as illustrated in FIG. 8 may be adopted. FIG. 8 is a plan view illustrating a configuration in which the floating section 34 and the rigid section 30 are connected by the connecting pipe 70 according to a modification. Illustrations of the mounting pieces 30a, 30b, 34a, and 34b are omitted in FIG. 8.

The connecting pipe 70 illustrated in FIG. 8 is a cylindrical body formed of a rigid metal or a resin. The connecting pipe 70 has one end connected to the outer wall surface 44b of the first box part 44 by using a vibration buffer part 71, and the other end connected to the inner wall surface 48b of the second box part 40 by using a vibration buffer part 72. The vibration buffer parts 71 and 72 are respectively, for example, a rubber-made O ring or a rubber tube. Although such a connecting pipe 70 itself is rigid and does not have a vibration buffering function, the ends thereof are connected to the first box part 44 and the second box part 40 through the vibration buffer parts 71 and 72, and hence the vibration of the first box part 44 can be suppressed from being transmitted to the second box part 40. The vibration buffer part may be configured of only one of the vibration buffer parts 71 and 72.

Incidentally, the present invention is not limited to the above-described embodiments. It is needless to say that the present invention may be freely changed within the scope not departing from the spirit of the present invention.

In the above embodiment, the second box part 40 is provided in the rigid section 30 disposed adjacent to the floating section 34 as the low-tone speaker of the four speakers having the low-tone speakers configured of the speaker parts 45 and the floating sections 34L and 34R, and the high-tone speakers 36L and 36R. The second box part 40 is connected to the first box part 44 to enlarge the chamber capacity of the first box part 44. It is however possible to appropriately change the expansion of the chamber capacity of the speaker box of any speaker by the rigid section 30. Also, the arrangement of the rigid section 30, the floating section 34, the antennas 32L and 32R, and the speakers 36L and 36R, and the like can also be changed as appropriate. Further, the speaker part 45 and the floating section 34 may configure a speaker not for a low tone but for a full range, for example.

Although the above embodiment has exemplified the second box part 40 having the L-shape in plan view, the shape of the second box part 40 may be other shapes, e.g., a rectangular shape in plan view or the like. Further, the sectional shape of the second box part 40, i.e., the sectional shape of the cavity portion 40a may also be, e.g., a rectangular shape or a circular shape or the like other than the triangular shape. Likewise, the shape of the first box part 44 may be changed as appropriate.

Although the above embodiment has exemplified the configuration in which the rigid section 30, the floating section 34, the antennas 32L and 32R, and the speakers 36L and 36R are mounted to the main body chassis 14, all or part of these may be mounted to the display chassis 18.

DESCRIPTION OF SYMBOLS

10 electronic apparatus
14 main body chassis
22 top cover
22e, 24a inner surface
24 bottom cover
30L, 30R rigid section
34L, 34R floating section
36L, 36R high-tone speaker
40 second box part
40a, 44a cavity portion
41 antenna
44 first box part
45 speaker part
46, 70 connecting pipe
46a, 71, 72 vibration buffer part
60 shield member
62 shield wall
64, 65 radio wave transmission part
66 conductive part.

The invention claimed is:

1. An electronic apparatus comprising:
   a chassis;
   a floating section comprising:
      a speaker part; and
      a first box part comprising a first cavity portion as a back chamber of the speaker part and that is fixed to the chassis in a floatable state inside the chassis;
   a rigid section comprising a second box part provided with a second cavity portion and that is rigidly fixed to the chassis inside the chassis and formed with an antenna on at least a part of the second box part; and
   a connecting pipe that connects the first box part and the second box part through a vibration buffer part and communicates the first cavity portion and the second cavity portion with each other.

2. The electronic apparatus according to claim 1, wherein the connecting pipe is formed of a material having rubber elasticity and includes a function of the vibration buffer part.

3. The electronic apparatus according to claim 1, wherein an outer wall of the chassis comprises a radio wave transmission part formed of a radio wave transmissive material, and a conductive part formed of a conductive material, and
   wherein the antenna is disposed facing the radio wave transmission part and electrically connected to the conductive part.

4. The electronic apparatus according to claim 3, wherein the rigid section is disposed along the outer wall of the chassis, and
   wherein the rigid section comprises, at a surface of the second box part where the antenna is not formed, a shield wall formed of an electromagnetic wave shielding material.

5. The electronic apparatus according to claim 3, wherein a shield member formed of an electromagnetic wave shielding material is disposed at a part of the surface of the second box part, and the shield member is in contact with an inner surface of the chassis.

6. The electronic apparatus according to claim 1, further comprising a high-tone speaker disposed inside the chassis, wherein the speaker part, the floating section, the rigid section, and the connecting pipe are configured to a low-tone speaker.

\* \* \* \* \*